3,061,635
PROCESS FOR PREPARING 3-Δ⁵-B-NORSTEROID COMPOUNDS
Katsumi Tanabe, Ryozo Hayashi, and Rinji Takasaki, all % Shinagawa Factory, Sankyo Company, Limited, 888 1-chome, Nishishinagawa, Shinagawa-ku, Tokyo, Japan
No Drawing. Filed Jan. 4, 1961, Ser. No. 80,551
8 Claims. (Cl. 260—488)

This invention relates to improvement of process for preparing 3-acyloxy-Δ⁵-B-norsteroid compound having the general formula

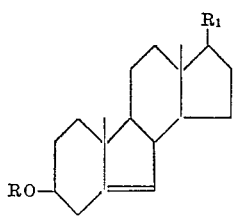

wherein R is a lower alpihatic acyl radical and $R_1$ represents a keto (=O), acetyl or $-C_8H_{17}$ radical.

Modification of steroid nucleus, such as for example preparation of A-norsteroid, B-norsteroid or D-homosteroid has been recently reported in expectation of manifestation of unique physiological actions. For example, methods for the preparation of 3-acyloxy-Δ⁵-B-norsteroid were reported by F. Sorm et al. [Coll. Czech. Chem. Comm. 12, 437 (1947); 13, 407 (1948); 23, 1377 (1958)], W. G. Dauben et al. [J. Am. Chem. Soc. 78, 4736 (1956)], T. Rull et al. [Bull. soc. chim. France 1581 (1958)] and H. B. Kagan et al. [ibid. 1600 (1958)]. These methods may be chemically shown by the following reaction schema:

Method by F. Sorm et al. and W. G. Dauben et al.

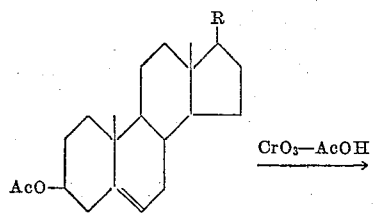

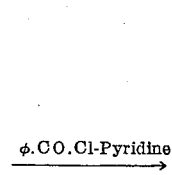

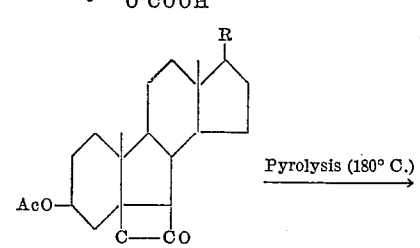

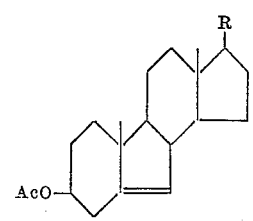

wherein R is $-C_8H_{17}$ or =O.

Method by T. Rull et al. and H. B. Kagan et al.

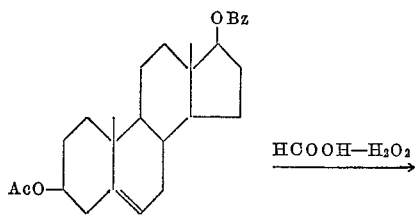

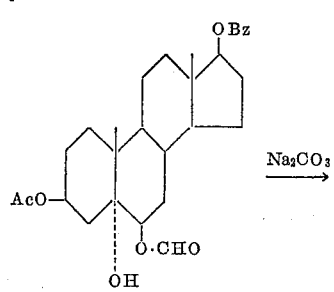

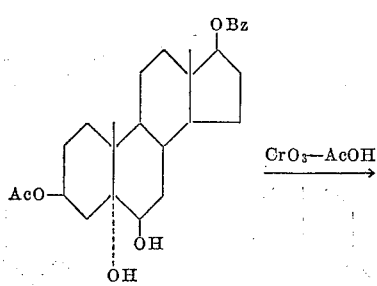

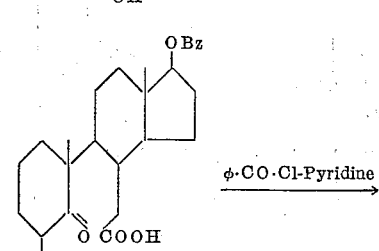

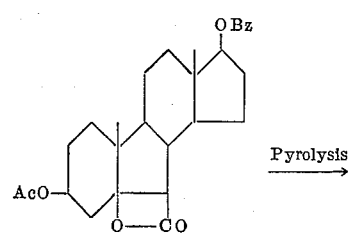

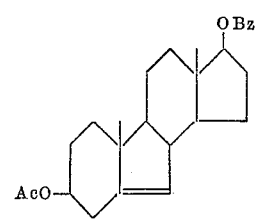

The hitherto known methods of preparing B-norsteroid as mentioned above are carried out in every case via the 5,6-seco-5-oxo-6-carboxylic acid of the corresponding steryl acetate and give the desired product only in low yields.

It is an object of this invention to provide a process for obtaining 3-acyloxy-Δ⁵-B-norsteroid compound in a convenient way and in a higher yield.

Other objects of this invention will be apparent in the descriptions hereinbelow.

According to the present invention, these objects are accomplished by a process which comprises subjecting 3-acyloxy-$\Delta^5$-steroid compound represented by the Formula II to ozonization in the presence of a lower aliphatic aldehyde, such as for example, formaldehyde, acetaldehyde or propionaldehyde, subjecting the resulting ozonide to reductive ring cleavage, then chromatographing the resulting compound on acid-washed alumina to give 3-acyloxy-5-hydroxy-6-formyl-B-norsteroid compound having the Formula III, oxidizing the compound thus obtained with chromic anhydride to form 3,5-dihydroxy-B-norsteroid-6-carboxylic acid 3-acylate having the Formula IV, and then subjecting the compound thus obtained to heating with acetic anhydride or pyrolysis to form the compound represented by the Formula I as described above.

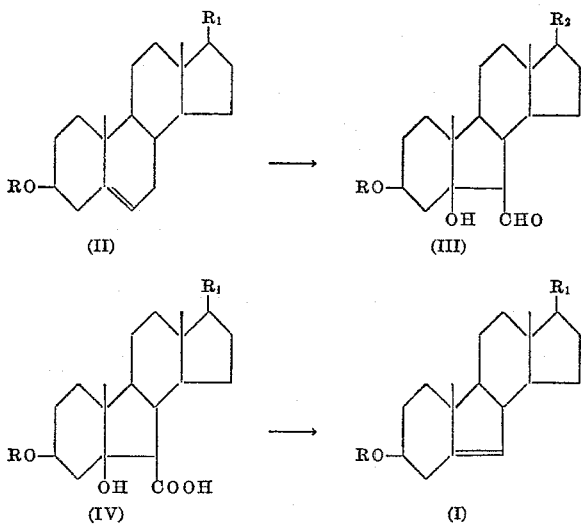

R and $R_1$ in the above-described schema have the same meanings as above.

The method of converting the compound having the Formula II to the compound having the Formula III may be achieved by the following procedure: Into a solution of $\Delta^5$-3-acyloxy steroid compound having the Formula II and a lower aliphatic aldehyde in an inert organic solvent such as for example, methylene chloride, chloroform and the like is introduced ozone at a low temperature between $-20°$ C. and $-60°$ C.; completion of the ozonization reaction may be estimated by the appearance of pale violet colour of ozone in the reaction mixture; after completion of the reaction, the reaction mixture is stirred with zinc dust and acetic acid or subjected to catalytic reduction to cause the reductive cleavage of the ozonized product; the reaction mixture is filtered to remove the zinc dust and the solvent distilled off from the filtrate; the residue is chromatographed on acid-washed alumina and eluted using a suitable solvent or solvent combination, such as for example, benzene, petroleum ether-benzene (1:1), ether or benzene-ether to yield 3-acyloxy-5-hydroxy-6-formyl-B-norsteroid compound having the Formula III.

The 3-acyloxy-5-hydroxy-6-formyl-B-norsteroid compound having the Formula III obtained in the above described way is then converted to 3,5-dihydroxy-B-norsteroid having the Formula IV by oxidation with chromic anhydride. This oxidation is effected by allowing 3-acyloxy-5-hydroxy-6-formyl-B-norsteroid and chromic anhydride in acetic acid to stand at room temperature for several hours. After completion of the reaction, the excess of chromic anhydride is decomposed by the use of alcohols, followed by addition of water to precipitate crystals of the corresponding carboxylic acid. The crystals may be purified by recrystallization from solvent such as petroleum ether-acetone or acetone-water.

A mixture of the 3,5-dihydroxy-B-norsteroid-6-carboxylic acid 3-acylate thus obtained and acetic anhydride is heated under reflux for about 2 hours to transform the former into 3-acyloxy-$\Delta^5$-B-norsteroid compound having the Formula I. After completion of the reaction, the acetic anhydride is removed under reduced pressure and the residue purified by recrystallization from solvent such as methanol, ethanol or acetone-methanol.

In place of the procedure as described above, the 3,5-dihydroxy-B-norsteroid-6-carboxylic acid may be heated to melt in an oil bath to convert it into 3-acyloxy-$\Delta^5$-B-norsteroid compound having the Formula I.

The B-norsteroid compounds obtained according to the process of this invention are useful as biochemicals, medicinals and intermediates thereof, and this invention provides a practical and predominant process for preparing such useful compounds.

The following examples will illustrate the invention in greater detail, and it is to be understood that the invention is not to be limited thereto but is to be illustrative.

*Example 1*

Into a solution of 12.87 g. of cholesteryl acetate and 9 g. of formaldehyde obtained by pyrolysis of paraformaldehyde in 400 cc. of methylene chloride is introduced an ozonized air (1.28 m. moles of ozone/min.) with external cooling by a freezing mixture of Dry Ice and acetone for a period of 33 min. whereby the reaction mixture becomes pale violet. To the reaction mixture are added 20 g. of zinc dust and 25 cc. of glacial acetic acid and the resulting mixture is stirred at room temperature for 2.5 hours, followed by filtration. The filtrate is washed with water and dried over anhydrous sodium sulfate. The solvent is concentrated in vacuum to obtain an oily substance weighing 13 g. A solution of the substance in petroleum ether (B.P. 60–80° C.)-benzene (1:1) is chromatographed on 300 g. of acid-washed alumina. Elutions with petroleum ether-benzene (1:1) and benzene give 3.5-dihydroxy-6-formyl-B-norcholestane 3-acetate, 6.8 g. (50% of the theoretical amount), M.P. 88–93° C. Recrystallization from methanol gives needles melting at 93–95° C.

*Analysis.*—Found: C, 75.68; H, 10.86. Calcd. for $C_{29}H_{48}O_4$: C, 75.60; H, 10.50.

To a solution of 0.79 g. of 3.5-dihydroxy-6-formyl-B-norcholestane 3-acetate obtained as above in 18 cc. of 90%-acetic acid is added dropwise with cooling by ice a solution of 0.232 g. of chromic anhydride in 6 cc. of 90%-acetic acid. After allowing to stand at room temperature for 5 hours, 1 cc. of ethanol is added to the reaction mixture and the mixture is allowed to stand for additional 30 min. To the resulting reaction solution are added 20 cc. of water and the crystals thus separated are filtered to obtain 0.70 g. of 3,5-dihydroxy-B-norcholestane-6-carboxylic acid 3-acetate (97% of the theoretical amount) M.P. 189–194° C. Recrystallization from petroleum ether-acetone gives silky crystals, M.P. 199–200° C., $[\alpha]_D^{26.5}$ +31.3° (c.=0.95 in chloroform).

*Analysis.*—Found: C, 72.86; H, 9.93. Calcd. for $C_{29}H_{48}O_5$: C, 73.07; H, 10.15.

A solution of 112 mg. of 3,5-dihydroxy-B-norcholestane-6-carboxylic acid 3-acetate obtained as above in 6 cc. of acetic acid is heated under reflux on an oil bath for 2 hours, followed by distillation of the acetic anhydride in vacuum. Crystallization of the residue from a small amount of methanol gives 3-acetoxy-B-norcholest-5-ene, 72 mg. (74% of the theoretical amount), M.P. 72–78° C. Recrystallization from acetone-methanol gives the product melting at 81.5–82.5° C. and having $[\alpha]_D^{27}$ −89.2° (c.=1.0 in chloroform).

*Analysis.*—Found: C, 81.10; H, 11.21. Calcd. for $C_{28}H_{46}O_2$: C, 81.11; H, 11.18.

In place of the above-described procedure pyrolysis of 200 mg. of 3 5-dihydroxy-B-norcholestane-6-carboxylic acid 3-acetate obtained as above by heating in a test tube on an oil bath at 240–250° C. for 15 min. and recrystallization of the product from acetone-methanol gives 72 mg. of 3-acetoxy-B-norcholest-5-ene (42% of the theoretical amount), M. P. 80–81° C.

*Example 2*

Into a solution of 10.75 g. of pregnenolone acetate and 14 g. (11 mol. equivalents) of formaldehyde obtained by pyrolysis of paraformaldehyde in 800 cc. of methylene chloride is introduced an ozonized air (0.54 mmoles of ozone/min.) with external cooling by a freezing mixture of Dry Ice and acetone for a period of 65 min. to give a pale violet reaction mixture. The mixture is stirred with 20 g. of zinc dust and 70 cc. of glacial acetic acid at room temperature for 3 hours, followed by filtration of inorganic materials. The filtrate is washed with water and dried over anhydrous sodium sulfate. The solvent is distilled off in vacuum to yield 11.2 g. of colorless oily substance. A solution of the substance in benzene is chromatographed on 400 g. of acid-washed alumina. Elutions with benzene and benzene-ether (2:1) give 3,5-dihydroxy-6-formyl-B-norpregnan-20-one 3-acetate, 7.5 g. (62% of the theoretical amount), M.P. 102–106° C. Recrystallization from ether gives the product melting at 104–106.5° C. and having $[\alpha]_D^{29}$ +71.° C. (c.=1.008 in chloroform).

*Analysis.*—Found: C, 70.93; H, 8.67. Calcd. for $C_{23}H_{34}O_5$: C, 70.74; H, 8.78.

To a solution of 1.53 g. of 3,5-dihydroxy-6-formyl-B-norpregnan-20-one 3-acetate in 30 cc. of 90%-acetic acid is added dropwise with cooling by ice in a solution of 0.78 g. of chromic anhydride in 20 cc. of 90%-acetic acid. After allowing to stand at room temperature for 4 hours, 1 cc. of ethanol is added to the reaction mixture to decompose the excess of chromic anhydride and the solvent is distilled off under reduced pressure. Petroleum ether is then added to the residue to give 1.40 g. of crystals melting at 184–188° C., which are 3,5-dihydroxy-B-norpregnan-20-one-6-carboxylic acid 3-acetate (89% of the theoretical amount). Recrystallization from petroleum ether-acetone gives needles, M.P. 190–192° C., $[\alpha]_D^{28}$ +72.2° (c.=0.69 in chloroform).

*Analysis.*—Found: C, 68.19; H, 8.68. Calcd. for $C_{23}H_{34}O_6$: C, 67.95; H, 8.43.

A solution of 180 mg. of 3,5-dihydroxy-B-norpregnan-20-one-6-carboxylic acid 3-acetate obtained as above in 7 cc. of acetic anhydride is heated on an oil bath under reflux for 2.5 hours. After cooled, the acetic anhydride is distilled off from the reaction mixture in vacuum and the residue is mixed with a small amount of methanol to give 120 mg. of 3-acetoxy-B-norpregn-5-en-20-one melting at 114–118° C. (75% of the theoretical amount). Recrystallization from methanol gives needles, M.P. 120.5–121.5° C., $[\alpha]_D^{28}$ −26.2° (c.=1.486 in chloroform).

*Analysis.*—Found: C, 76.98; H, 9.58. Calcd. for $C_{22}H_{32}O_3$: C, 76.76; H, 9.36.

In place of the procedure described above, 120 mg. of 3,5-dihydroxy-B-norpregnan-20-one-6-carboxylic acid 3-acetate are placed in a test tube and heated on an oil bath at 240–250° C. Decomposition with bubbling occurs. Recrystallization from methanol gives 38 mg. of 3-acetoxy-B-norpregn-5-en-20-one melting at 120–121° C. (36% of the theoretical amount).

*Example 3*

Into a solution of 7.25 g. of dehydroepiandrosterone acetate and 12 g. of formaldehyde obtained by pyrolysis of paraformaldehyde in 800 cc. of methylene chloride is introduced an ozonized air (0.3 mmoles of ozone/min.) with external cooling by a freezing mixture of Dry Ice and acetone for a period of 90 min. to give a pale violet reaction solution. To the solution are added 20 g. of zinc dust and 80 cc. of glacial acetic acid and the mixture is stirred at room temperature for 4 hours, followed by filtration of inorganic materials. The filtrate is washed with water and dried over anhydrous sodium sulfate. The solvent is then evaporated under reduced pressure to give 8.5 g. of an oily substance. The substance is chromatographed on 300 g. of acid-washed alumina. Elutions with benzene-ether (1:1) and ether give 3.32 g. of 3,5-dihydroxy-6-formyl-B-norandrostan-17-one 3-acetate. Recrystallization from ether gives crystals melting at 132–134° C., $[\alpha]_D^{29}$ +74.7° (c.=2.41 in chloroform).

*Analysis.*—Found: C, 69.30; H, 8.18. Calcd. for $C_{21}H_{30}O_5$: C, 69.58; H, 8.34.

To a solution of 1.03 g. of 3,5-dihydroxy-6-formyl-B-norandrostan-17-one 3-acetate in 25 cc. of 90%-acetic acid is added dropwise with cooling by ice a solution of 0.45 g. of chromic anhydride in 10 cc. of 90%-acetic acid. The mixture is allowed to stand at room temperature for 5 hours, and, after addition of 1.5 cc. of ethanol, the resulting mixture is allowed to stand for additional 30 min. To the reaction mixture are then added 30 cc. of water and crystals thus separated are filtered to afford 0.804 g. of 3,5-dihydroxy-17-oxo-B-norandrostane-6-carboxylic acid 3-acetate. Recrystallization from petroleum ether-acetone gives prisms melting at 173–174° C., $[\alpha]_D^{30}$ +90.51° C. (c.=1.62 in chloroform) (74.8% of the theoretical amount).

*Analysis.*—Found: C, 66.41; H, 7.83. Calcd. for $C_{21}H_{30}O_6$: C, 66.64; H, 7.99.

A solution of 192 mg. of 3,5-dihydroxy-17-oxo-B-norandrostane-6-carboxylic acid 3-acetate in 8 cc. of acetic anhydride is heated on an oil bath under reflux for 2 hours, followed by distillation of the acetic anhydride in vacuum. The residue is recrystallized from methanol to give 3-acetoxy-B-norandrost-5-en-17-one, M.P. 134–136° C., $[\alpha]_D^{30}$ −23.5°. The yield is 75% of the theoretical amount.

*Analysis.*—Found: C, 75.99; H, 8.75. Calcd. for $C_{20}H_{28}O_3$: C, 75.91; H, 8.92.

In place of the procedure described above, 100 mg. of 3,5-dihydroxy-17-oxo-B-norandrostane-6-carboxylic acid 3-acetate are placed in a test tube and heated on an oil bath at 240–250° C. Decomposition occurs with bubbling. The product is recrystallized from methanol to give 3-acetoxy-B-norandrost-5-en-17-one. The yield is 41% of the theoretical amount.

We claim:

1. A process for preparing $\Delta^5$-acyloxy-B-norsteroid compound having the general formula

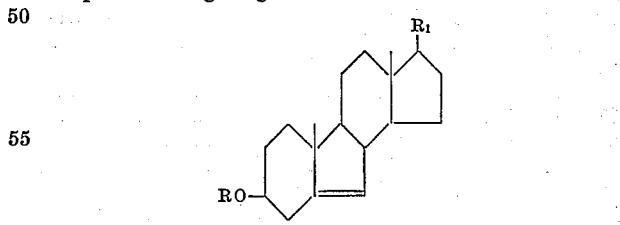

wherein R represents a lower aliphatic acyl radical and $R_1$ is selected from the group consisting of keto acetyl and —$C_8H_{17}$ radicals, which comprises ozonizing a $\Delta^5$-3-acyloxy steroid compound having the general formula

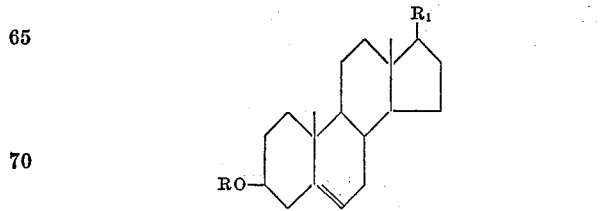

wherein R and $R_1$ have the same meanings as above, with ozone in the presence of a lower aliphatic aldehyde, subjecting the resulting ozonide to reductive cleavage, then chromoatographing the compound obtained to form 3 - acyloxy-5-hydroxy-6-formyl-B-norsteroid compound having the general formula

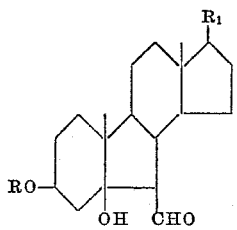

wherein R and $R_1$ have the same meanings as above, oxidizing the compound obtained to form 3,5-dihydroxy-B-norsteroid-6-carboxylic acid 3-acylate having the general formula

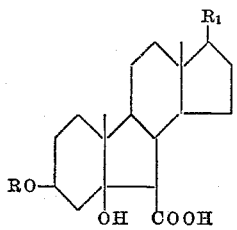

wherein R and $R_1$ have the same meanings as above, and then subjecting the compound thus obtained to a heat treatment with acetic anhydride.

2. A process for preparing 3-acetoxy-B-nor-$\Delta^5$-cholestene which comprises ozonizing cholesteryl acetate with ozone in an inert solvent in the presence of formaldehyde, treating the ozonide with zinc dust and acetic acid to cause reductive cleavage, chromatographing the compound obtained to form 3-acetoxy-5-hydroxy-6-formyl-B-norcholestane, oxidizing the compound obtained to form 3,5-dihydroxy-B-norcholestrane-6-carboxylic acid 3-acetate and then subjecting the compound obtained to heat treatment in acetic anhydride.

3. A process for preparing 3-acetoxy-B-nor-$\Delta^5$-pregnen-20-one which comprises ozonizing pregnenolone acetate with ozone in an inert solvent in the presence of formaldehyde, treating the ozonide with zinc dust and acetic acid to cause reductive cleavage, chromatographing the compound obtained to form 3,5-dihydroxy-6-formyl-B-norpregnan-20-one 3-acetate, oxidizing the compound obtained to form 3,5-dihydroxy-B-norpregnan-20-one-6-carboxylic acid 3-acetate and then subjecting the compound obtained to heat treatment in acetic anhydride.

4. A process for preparing 3-acetoxy-B-norandrost-5-en-17-one which comprises ozonizing dehydroepiandrosterone acetate with ozone in an inert solvent in the presence of formaldehyde, treating the ozonide with zinc dust and acetic acid to cause reductive cleavage, chromatographing the compound obtained to form 3,5-dihydroxy-6-formyl-B-norandrostan-17-one 3-acetate, oxidizing the compound obtained to form 3,5-dihydroxy-17-oxo-B-norandrostane-6-carboxylic acid 3-acetate and then subjecting the compound obtained to heat treatment in acetic anhydride.

5. A process for preparing $\Delta^5$-acyloxy-B-norsteroid compound having the general formula

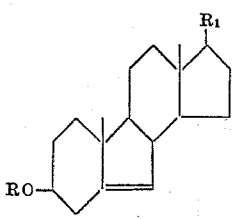

wherein R represents a lower aliphatic acyl radical and $R_1$ is selected from the group consisting of keto, acetyl and —$C_8H_{17}$ radicals, which comprises ozonizing $\Delta^5$-3-acyloxy steroid compound having the general formula

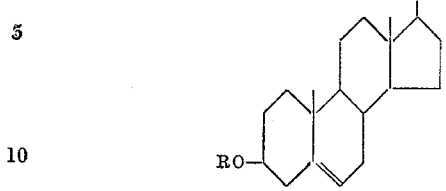

wherein R and $R_1$ have the same meanings as above, with ozone in the presence of a lower aliphatic aldehyde, subjecting the resulting ozonide to reductive cleavage, then chromatographing the compound obtained to form 3-acyloxy-5-hydroxy-6-formyl-B-norsteroid compound having the general formula

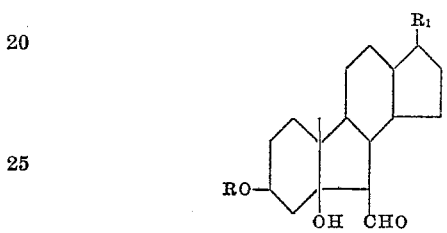

wherein R and $R_1$ have the same meanings as above, oxidizing the compound obtained to form 3,5-dihydroxy-B-norsteroid-6-carboxylic acid 3-acylate having the general formula

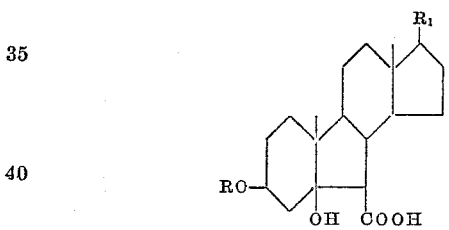

wherein R and $R_1$ have the same meanings as above, and then subjecting the compound thus obtained to pyrolysis.

6. A process for preparing 3-acetoxy-B-nor-$\Delta^5$-cholestene which comprises ozonizing cholesteryl aceate with ozone in an inert solvent in the presence of formaldehyde, treating the ozonide with zinc dust and acetic acid to cause reductive cleavage, chromatographing the compound obtained to form 3-acetoxy-5-hydroxy-6-formyl-B-norcholestane, oxidizing the compound obtained to form 3,5-dihydroxy-B-norcholestane-6-carboxylic acid 3-acetate and then subjecting the compound obtained to pyrolysis.

7. A process for preparing 3-acetoxy-B-nor-$\Delta^5$-pregnen-20-one which comprises ozonizing pregnenolone acetate with ozone in an inert solvent in the presence of formaldehyde, treating the ozonide with zinc dust and acetic acid to cause reductive cleavage, chromatographing the compound obtained to form 3,5-dihydroxy-6-formyl-B-norpregnan-20-one 3-acetate, oxidizing the compound obtained to form 3,5-dihydroxy-B-norpregnan-20-one-6-carboxylic acid 3-acetate and then subjecting the compound obtained to pyrolysis.

8. A process for preparing 3-acetoxy-B-norandrost-5-en-17-one which comprises ozonizing dehydroepiandrosterone acetate with ozone in an inert solvent in the presence of formaldehyde, treating the ozonide with zinc dust and acetic acid to cause reductive cleavage, chromatographing the compound obtained to form 3,5-dihydroxy-6-formyl-B-norandrostan-17-one 3-acetate, oxidizing the compound obtained to form 3,5-dihydroxy-17-oxo-B-norandrostane-6-carboxylic acid 3-acetate and then subjecting the compound obtained to pyrolysis.

No references cited.